Sept. 15, 1925.
H. R. BERRY
CLUTCH PEDAL ATTACHMENT
Filed March 13, 1922
1,553,591
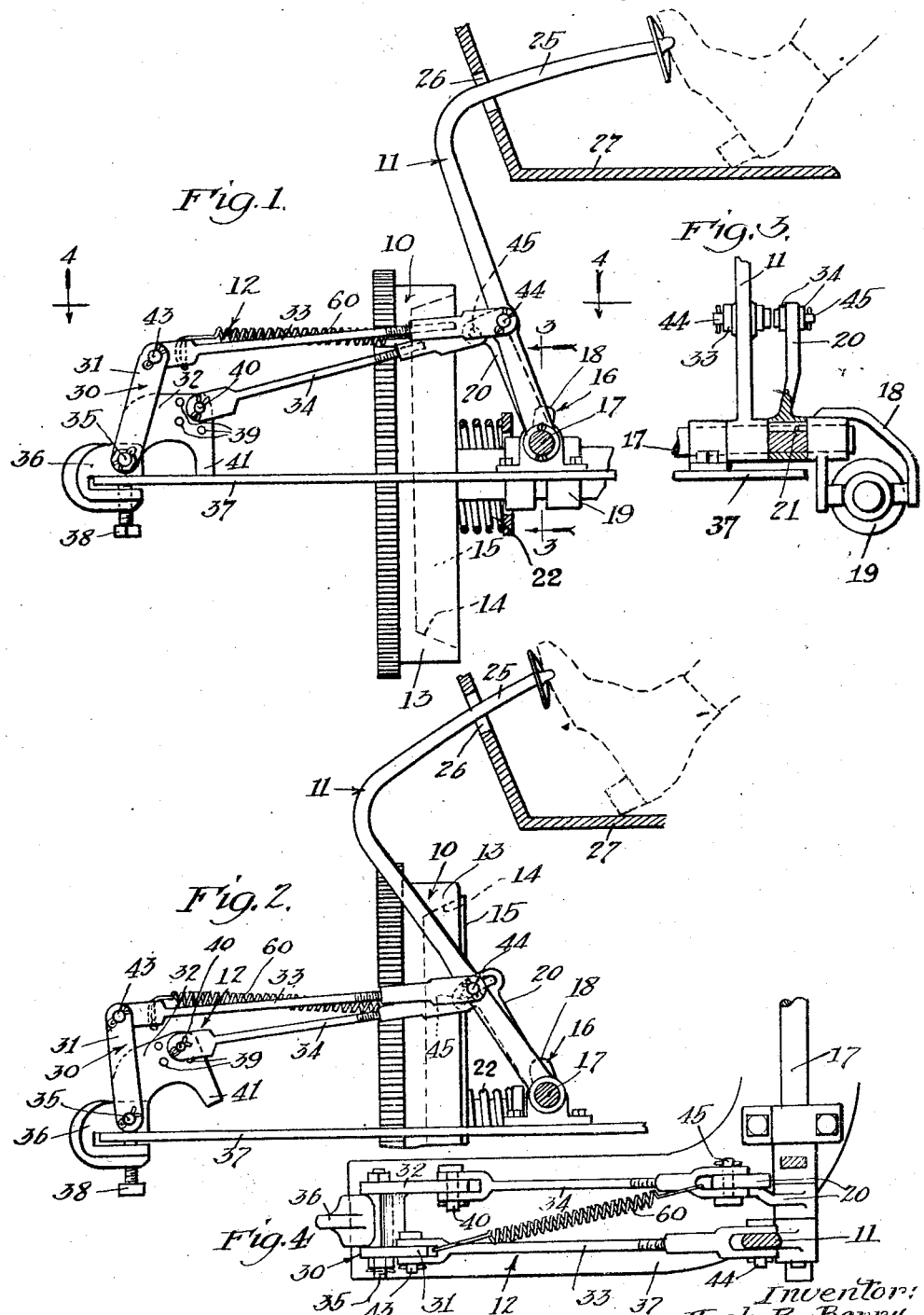

Patented Sept. 15, 1925.

1,553,591

UNITED STATES PATENT OFFICE.

HUGH R. BERRY, OF LOS ANGELES, CALIFORNIA, ASSIGNOR TO THE BALDWIN CORPORATION, OF LOS ANGELES, CALIFORNIA, A CORPORATION OF CALIFORNIA.

CLUTCH-PEDAL ATTACHMENT.

Application filed March 13, 1922. Serial No. 543,469.

*To all whom it may concern:*

Be it known that I, HUGH R. BERRY, a citizen of the United States, residing at Los Angeles, in the county of Los Angeles and State of California, have invented new and useful Improvements in Clutch-Pedal Attachments, of which the following is a specification.

This invention has to do with a mechanism to be attached to or embodied in the control mechanism of a motor vehicle clutch, or the like, and it is an object of the invention to provide a mechanism which will increase the mechanical advantage of the control member over the clutch mechanism and will vary the leverage of the control member with relation to the clutch mechanism so that the control member has a greater leverage over the clutch mechanism when the clutch mechanism is in than it has when the clutch mechanism is out.

In some motor vehicles the spring, which normally holds the clutch in, is so strong and the mechanical advantage of the clutch pedal over the spring, or clutch mechanism, is so small that it is difficult to operate the clutch. Further, in some motor vehicles, and usually in vehicles in which the clutch is hard to operate, the clutch is operated by a comparatively small movement of the clutch pedal making it more or less difficult to operate smoothly.

It is an object of this invention to provide a mechanism which can be applied to a motor vehicle to overcome the inconvenient features above mentioned. The mechanism provided by the invention increases the mechanical advantage of the clutch pedal over the clutch mechanism and therefore increases the amount of movement of the clutch pedal necessary to operate the clutch mechanism. This obviously makes it much easier to move the clutch mechanism and also makes it much easier to operate the clutch mechanism smoothly.

The various objects and features of the invention will be best and more fully understood from the following detailed description of a typical preferred form and embodiment of the invention throughout which reference is had to the accompanying drawings in which:—

Fig. 1 is a view showing the mechanism provided by the present invention arranged in connection with the clutch and clutch control pedal of a typical motor vehicle, the parts being shown in the unactuated position in which the clutch is in; Fig. 2 is a view similar to Fig. 1 showing the parts in an actuated position in which the clutch is out; Fig. 3 is a detailed view taken as indicated by line 3—3 on Fig. 1, certain of the parts being broken away to show in section; and Fig. 4 is a plan section taken as indicated by line 4—4 on Fig. 1.

In the drawings numeral 10 designates a typical motor vehicle clutch, numeral 11 designates the control pedal for the clutch and numeral 12 designates the mechanism embodying the present invention. The particular clutch which I have illustrated in the drawings is of the type known as a cone clutch and embodies a fly wheel 13 having a conical shaped recess 14, a conical shaped movable clutch part 15 adapted to co-operatively seat in the recess 14, and spring means (not shown) for normally holding the clutch part 15 in cooperative position in the recess 14. There is an operating mechanism 16 for the clutch which comprises a shaft 17, a yoke 18 mounted on the shaft 17 to cooperate with a grooved sleeve 19 which is attached to the clutch part 15, and an operating arm 20 which is secured on the shaft 17. The arm 20 may be secured on the shaft 17 in any suitable manner, for instance, by a key 21, as I have illustrated in Fig. 3 of the drawings. With the particular structure and arrangement just described movement of the operating arm 20 causes rotation of the shaft 17 thus causing movement of the yoke 18 and operation of the clutch member 15. The clutch is closed by its usual springs, of which the spring shown at 22 may be taken as an illustration.

The control pedal 11 may be, as I have shown in the drawings, the usual type of clutch control pedal adapted to be manually operated. The particular pedal which I have illustrated in the drawings is pivotally mounted on the shaft 17 and has an end part 25 which extends through an opening 26 in the floor 27 of the vehicle in a manner to be engaged by the operator's foot, as illustrated in Figs. 1 and 2 of the drawings.

The mechanism 12 embodying the present invention comprises a pivotally mounted bell crank 30 having two arms 31 and 32, and two connecting rods 33 and 34. The connecting rod 33 connects the arm 31 of the bell crank 30 with the control pedal 11 while the connecting rod 34 connects the arm 32 of the bell crank 30 with the operating arm 20 of the clutch mechanism. The bell crank 30 may be mounted in any suitable manner, for instance it may be carried on a pivot pin 35 carried by a clamp bracket 36, adapted to clamp to a suitable stationary part 37 of the vehicle. The particular bracket 36 which I have illustrated in the drawings is designed so that it will fit over a stationary part 37 of the vehicle and is provided with a set screw 38 by which it can be secured on the stationary part 37. In accordance with the present invention the arms 31 and 32 of the bell crank 30 are arranged in about the angular relation illustrated in the drawings, and in accordance with the preferred form of the invention the arm 32 is shorter than the arm 31. Further, in accordance with the preferred form of the invention one of the arms, and preferably the arm 32, is provided with a plurality of openings 39, any one of which may be employed to carry the pivot pin 40 which connects the connecting rod 34 with the arm 32. The openings 39 are arranged at various points in the arm 32 so that by arranging the pin 40 in the various openings the effective angularity and length of the arm 32 may be varied. In the particular form of mechanism illustrated in the drawings the arm 32 of the bell crank 30 is provided with a projection 41 which is adapted to engage a stationary part of the vehicle when the control pedal 11 and mechanism 12 are unactuated, as illustrated in Fig. 1. The projection 41 acts as a limiting stop for the movement of the bell crank 30.

The connecting rod 33 is preferably made in two parts which screw thread together so that the rod can be adjusted as to length. One end of the connecting rod 33 is pivotally connected with the outer part of the arm 31 of the bell crank 30 by a suitable pivot pin 43, while the other end of the connecting rod 33 is pivotally connected with the control pedal 11, at a point somewhat removed from the axis of pivotal mounting of the lever 11, by a suitable pivot pin 44. The connecting rod 34, like the connecting rod 33, is preferably constructed so that it can be adjusted as to length and has one end connected to the arm 32 of the bell crank 30 by the pivot pin 40 being arranged through one of the openings 39 in the arm 32, and has its other end pivotally connected with the outer part of the operating arm of the clutch mechanism by a suitable pivot pin 45. In the particular mechanism illustrated in the drawings the pivot pin 44 connects the connecting rod 33 with the control pedal 11 at a point removed from the axis of the pedal a distance substantially equal to the distance the point of pivotal connection between the connecting rod 34 and arm 20 is from the axis of the shaft 17. In accordance with the present invention the connecting rods 33 and 34 are regulated as to length and are connected with the various parts so that when the control pedal is in its normal unactuated position, as illustrated in Fig. 1, the arm 31 forms a comparatively large angle with the connecting rod 33 while the arm 32 has very little, if any, angularity relative to the conecting rod 34. In fact, the parts are arranged and connected so that it may be said that the arm 31 forms an angle of somewhat more than 90° with the connecting rod 33 while the arm 32 is substantially in line with the connecting rod 34. Further, in accordance with the invention the parts are proportioned so that when the control pedal 11 is actuated, as illustrated in Fig. 2, the arm 31 forms an angle of somewhat less than 90° with the connecting rod 33 while the arm 32 has considerably more angularity relative to the connecting rod 34 than it had when the mechanism was in the unactuated position.

I have found in practice that it is desirable to provide a spring 60 in the mechanism 12 to aid the clutch spring in retaining the mechanism in the position shown in Fig. 1. I prefer to connect one end of the spring 60 with the operating arm 20 of the clutch mechanism at the point where the connecting rod 34 connects with said arm, and to connect the other end of the spring with the arm 31 of the bell crank where the connecting rod 33 connects with the arm 31. When the parts are in the position shown in Fig. 1 the spring 60 will not move the operating arm 20 against the clutch spring because of the arm 32 being substantially in line with the connecting rod 34, but it tends to pull the arm 31 toward the arm 20 and thus effectively holds the control pedal in the unactuated position. As the mechanism is operated from the position shown in Fig. 1 to that shown in Fig. 2 the relative positions of the parts vary so that the tendency for the spring 60 to move the arm 20 against the resistance of the clutch spring increases and thus aids the operator in operating the clutch. At all times, however, the spring 60 has a greater leverage on the arm 31 than it has on the arm 20 so that it always tends to return the mechanism to the position shown in Fig. 1.

In operation when the operator actuates the control pedal 11 from the position shown in Fig. 1 to that shown in Fig. 2 he causes the bell crank 30 to be swung from the position shown in Fig. 1 to that shown in Fig. 2 due to the connection between the bell crank and control pedal effected by the connecting rod 33. The parts being arranged and connected so that the arm 31 is at substantially right angles to the connecting rod 33 the bell crank 30 has an angular movement substantially equal to the angular movement of the control pedal 11. The difference between the angular movement of the bell crank and control pedal will, of course, depend upon the spacing of the pivotal connections of the connecting rod from the axes of the bell crank and pedal and the differences between the angular position of the arm 31 and the angular position of the pedal 11. However, in accordance with the preferred form of the invention the parts are arranged and proportioned so that the angular movement of the bell crank 30 is substantially equal to the angular movement of the control pedal 11. When the bell crank 30 is moved by operation of the pedal 11 the operating arm 20 of the clutch mechanism is moved from the arm 32 of the bell crank through the connecting rod 34. However, due to the fact that the arm 32 is shorter than the arm 31 and has an effective angularity different from that of the arm 31 and further, due to the fact that the arm 32 is substantially in line with the connecting rod 34 when operation starts the angular movement of the operating arm 20 of the clutch mechanism is considerably less than the angular movement of the control pedal 11. Further, the change in the angular relation between the rod 34 and arm 32 causes the leverage of the pedal 11 over the arm 20 to vary substantially during operation of the mechanism, the leverage of the pedal over the arm being greatest during the first part of the operation. From inspection of the drawings, particularly from Figs. 1 and 2 of the drawings, and from the foregoing description it will be obvious that the present invention provides means which increases the mechanical advantage of the control pedal 11 over the operating member of the clutch mechanism, comparing the mechanism and arrangement just described with the ordinary arrangement in which the control pedal 11 directly operates the shaft 17 either by being secured directly to it or being connected with an operating arm 20, and that the present invention provides means which varies the leverage of the control pedal 11 over the clutch mechanism a substantial amount so that the leverage is greatest when the clutch mechanism is closed, at which time the greatest leverage is most desirable. Thus, the means provided by the present invention makes the clutch mechanism more easily operated through the control pedal and makes it possible to operate the clutch mechanism more evenly and smoothly through the control pedal. After the mechanism has been actuated to the position shown in Fig. 2 to throw out the clutch it will be returned to its normal unactuated position as shown in Fig. 1 by the clutch spring and the spring 60. It is to be understood that I do not specifically limit myself to the particular form of mechanism herein set forth as it will be obvious how my invention may be embodied in or carried out by numerous different arrangements and combination of parts.

Having described only a typical embodiment of my invention I do not wish to limit myself to the details hereinabove set forth but wish to reserve to myself any changes or variations that may appear to those skilled in the art or fall within the scope of the following claims.

Having described a preferred form of my invention, I claim:

1. In combination with a control pedal and a clutch mechanism having an operating arm, a pivotally mounted bell crank having two arms, a connecting rod connecting the pedal with one of the arms of the bell crank so that said arm is at substantially right angles with said rod and a second connecting rod connecting the other arm of the bell crank with the operating arm so that said other arm is substantially in line with said second connecting rod.

2. In combination with a control pedal and a clutch mechanism having an operating arm, a pivotally mounted bell crank having two arms, a connecting rod connecting the pedal with one arm of the bell crank, and a second connecting rod connecting the other arm of the bell crank solely with the operating arm, the angle between the first mentioned connecting rod being less than the angle between said other arm of the bell crank and said second connecting rod.

3. In combination with a control pedal and a clutch mechanism having an operating arm, a pivotally mounted bell crank having two arms, one longer than the other, a connecting rod connecting the pedal with the long arm of the bell crank, and a second connecting rod connecting the short arm of the bell crank with the operating arm.

4. In combination with a control pedal and a clutch mechanism having an operating arm, a pivotally mounted bell crank having two arms, one longer than the other, a connecting rod connecting the pedal with the long arm of the bell crank, and a second connecting rod connecting the short arm of the bell crank with the operating arm, the angle between the long arm of the bell crank and said first mentioned connecting rod being less than the angle between the short arm of the bell crank and said second connecting rod.

5. In combination with a control pedal and a clutch mechanism having an operating arm, a pivotally mounted bell crank having two arms one longer than the other, a bracket pivotally carrying said bell crank, a connecting rod having one end pivotally connected to the pedal and the other end pivotally connected to the long arm of the bell crank, a second connecting rod having one end pivotally connected to the operating arm, and means for adjustably pivotally connecting the other end of the second connecting rod with the short arm of the bell crank, the angle between the long arm of the bell crank and said first mentioned connecting rod being less than the angle between the short arm of the bell crank and said second connecting rod.

6. In combination, a clutch mechanism, yielding means normally holding the clutch mechanism closed, and mechanism, for opening the clutch, embodying a manually operatable member and variable leverage interconnecting means between said member and the clutch and having a relatively greater leverage on the clutch when the clutch is closed and a relatively lesser leverage on the clutch when it is open; and a variable spring device acting on the clutch mechanism opposing the said yielding means more strongly when the clutch is open than when it is closed.

7. In combination, a clutch mechanism, yielding means normally holding the clutch mechanism closed, and mechanism for opening the clutch embodying a manually operatable member and variable leverage interconnecting means between said member and the clutch and its yielding closing means, said leverage having a relatively greater mechanical advantage on the clutch and its yielding closing means when the clutch is closed and a relatively lesser mechanical advantage thereon when the clutch is open.

In witness that I claim the foregoing I have hereunto subscribed my name this 1st day of March, 1922.

HUGH R. BERRY.